(12) United States Patent
Yadav et al.

(10) Patent No.: US 8,904,119 B2
(45) Date of Patent: Dec. 2, 2014

(54) METHOD AND STRUCTURES FOR PERFORMING A MIGRATION OF A LOGICAL VOLUME WITH A SERIAL ATTACHED SCSI EXPANDER

(71) Applicant: LSI Corporation, Milpitas, CA (US)

(72) Inventors: Nishant Kumar Yadav, Bangalore (IN); Umang Kumar, Bangalore (IN); Rajendra Singh, Howrah (IN)

( * ) Notice: Subject to any disclaimer, the term of this patent is extended or adjusted under 35 U.S.C. 154(b) by 249 days.

(21) Appl. No.: 13/664,766

(22) Filed: Oct. 31, 2012

(65) Prior Publication Data

US 2014/0122797 A1  May 1, 2014

(51) Int. Cl.
*G06F 12/16* (2006.01)

(52) U.S. Cl.
USPC .......................................... 711/152; 711/165

(58) Field of Classification Search
CPC ............ G06F 11/1458; G06F 11/1466; G06F 11/1469
USPC .................................................. 711/152, 165
See application file for complete search history.

(56) References Cited

U.S. PATENT DOCUMENTS

| | | | |
|---|---|---|---|
| 4,156,798 A | 5/1979 | Doelz | |
| 5,335,227 A | 8/1994 | Smith | |
| 5,579,480 A | 11/1996 | Cidon | |
| 6,096,116 A | 8/2000 | Huff et al. | |
| 6,199,137 B1 | 3/2001 | Aguilar | |
| 6,301,642 B1 | 10/2001 | Jones et al. | |
| 6,611,863 B1 | 8/2003 | Banginwar | |
| 7,650,446 B2 | 1/2010 | Nonaka et al. | |
| 7,738,366 B2 | 6/2010 | Uddenberg | |
| 7,912,992 B2 | 3/2011 | Suzuki | |
| 2002/0046566 A1 | 4/2002 | Liao | |
| 2003/0076788 A1 | 4/2003 | Grabauskas et al. | |
| 2003/0097438 A1 | 5/2003 | Bearden | |
| 2003/0217212 A1 | 11/2003 | Kim | |
| 2004/0205288 A1 | 10/2004 | Ghaffari | |
| 2005/0015532 A1 | 1/2005 | Beckett | |
| 2005/0066100 A1 | 3/2005 | Elliott | |
| 2005/0080881 A1 | 4/2005 | Voorhees | |
| 2006/0095625 A1 | 5/2006 | Wootten et al. | |
| 2006/0101171 A1 | 5/2006 | Grieff | |
| 2006/0156055 A1 | 7/2006 | Cherian | |
| 2007/0220204 A1 | 9/2007 | Nakajima | |

(Continued)

OTHER PUBLICATIONS

IBM SAS RAID Controller Module, Installation and user guide v2, © Copyright IBM Corp. 2008, 2009.

(Continued)

*Primary Examiner* — John Lane
(74) *Attorney, Agent, or Firm* — Duft Bornsen & Fettig LLP (57) ABSTRACT

Methods and structure for migrating a logical volume with a Serial Attached SCSI (SAS) expander are provided. The expander comprises a plurality of physical links with associated transceivers (PHYs). The expander further comprises a control unit operable to select a logical volume, and to initiate migration of data from the selected logical volume to a backup logical volume. Further, the expander includes a Serial SCSI Protocol (SSP) target of the expander operable to intercept commands directed to the selected logical volume responsive to the control unit initiating the migration, and an SSP initiator of the expander that is operable to generate commands directed to the backup logical volume based on the intercepted commands, and to provide the intercepted commands to the selected logical volume.

20 Claims, 4 Drawing Sheets

(56) References Cited

U.S. PATENT DOCUMENTS

| | | |
|---|---|---|
| 2007/0226415 A1 | 9/2007 | Holland |
| 2008/0189723 A1 | 8/2008 | Elliott |
| 2008/0288670 A1* | 11/2008 | Chambliss et al. ............. 710/33 |
| 2009/0007155 A1 | 1/2009 | Jones et al. |
| 2009/0094620 A1 | 4/2009 | Kalwitz |
| 2009/0282203 A1* | 11/2009 | Haustein et al. ............. 711/162 |
| 2011/0145452 A1 | 6/2011 | Schilling |
| 2012/0084486 A1 | 4/2012 | Jinno |
| 2012/0124286 A1 | 5/2012 | Galloway et al. |
| 2012/0144082 A1 | 6/2012 | Romero |
| 2012/0254535 A1 | 10/2012 | Hay et al. |
| 2013/0013828 A1 | 1/2013 | Pang et al. |
| 2014/0040510 A1 | 2/2014 | Myrah et al. |

OTHER PUBLICATIONS

Intel® RAID Expander RES2SV240, Product Brief, 2011.
Nested RAID levels, wikipedia, downloaded on Oct. 8, 2012.
U.S. Appl. No. 13/096,404, "Remote Execution of RAID in Large Topologies," filed Apr. 28, 2011.
U.S. Appl. No. 13/171,922, "Methods and Apparatus for Increasing Storage Network Perfromance by Managing a Logical Volume in a Storage Network Switching Component," filed Jun. 29, 2011.
U.S. Appl. No. 13/281,301, "Methods and Systems Using Solid-State Drives as Storage Controller Cache Memory ," filed Oct. 25, 2011.
U.S. Appl. No. 13/365,050, "Methods and Structure for an Improved Solid-State Drive for Use in Caching Applications," filed Feb. 2, 2012.

* cited by examiner

METHOD AND STRUCTURES FOR PERFORMING A MIGRATION OF A LOGICAL VOLUME WITH A SERIAL ATTACHED SCSI EXPANDER

BACKGROUND

1. Field of the Invention

The invention relates generally to Serial Attached SCSI (SAS) domains and more specifically relates to enhanced SAS expanders.

2. Discussion of Related Art

In SAS domains (i.e., electronic systems implementing a switched SAS fabric) it is common for a controller to manage a large number of logical volumes of data. The logical volumes are provisioned by SAS/SATA storage devices, which may be coupled for communication with the controller via one or more SAS expanders. The SAS expanders establish switched temporary communication channels between the controller and the various storage devices.

Common tasks performed by a controller when managing logical volumes include processing input and output (I/O) commands from a host device, performing consistency checks on the logical volumes, backing up the volumes, etc. However, backing up a logical volume takes up substantial amounts of processing power at the controller, because the controller generates and transmits a vast number of I/O commands to various storage devices as it backs up data to the volume. This is undesirable because the backup occupies processing resources at the controller that could otherwise be used to process host I/O. Furthermore, the backup process can reduce the available bandwidth of the entire SAS domain, because communication channels between the controller and the expanders that route backup I/O to the appropriate storage devices may be occupied for the entire duration of the backup process. This precludes other connections that would use the same pathways through the SAS expanders.

Thus it is an ongoing challenge to enhance the performance of a controller in processing host I/O when a logical volume is backed up.

SUMMARY

The present invention addresses the above and other problems, thereby advancing the state of the useful arts, by providing methods and structure for utilizing enhanced SAS expanders that are capable of performing data migration/backup of logical volumes. This eliminates the need for a controller to perform this task. Thus, the controller may process incoming host I/O instead of migrating (i.e., copying or moving) data from a logical volume.

In one aspect hereof, a method is provided for operating a Serial Attached SCSI (SAS) expander. The method includes selecting, via a control unit of the expander, a logical volume. The method further includes initiating, via the control unit, migration of data from the selected logical volume to a backup logical volume. Additionally, the method includes intercepting, via a Serial SCSI Protocol (SSP) target of the expander, commands directed to the selected logical volume responsive to the control unit initiating the migration. Still further, the method includes generating, via an SSP initiator of the expander, commands directed to the backup logical volume based on the intercepted commands, and providing, via the SSP initiator, the intercepted commands to the selected logical volume.

Another aspect hereof provides a Serial Attached SCSI (SAS) expander. The expander comprises a plurality of physical links with associated transceivers (PHYs). The expander further comprises a control unit operable to select a logical volume, and to initiate migration of data from the selected logical volume to a backup logical volume. Further, the expander includes a Serial SCSI Protocol (SSP) target of the expander operable to intercept commands directed to the selected logical volume responsive to the control unit initiating the migration, and an SSP initiator of the expander that is operable to generate commands directed to the backup logical volume based on the intercepted commands, and to provide the intercepted commands to the selected logical volume.

Another aspect hereof provides a non-transitory computer readable medium embodying programmed instructions which, when executed by a processor, are operable for performing a method for operating a Serial Attached SCSI (SAS) expander. The method includes selecting, via a control unit of the expander, a logical volume. The method further includes initiating, via the control unit, migration of data from the selected logical volume to a backup logical volume. Additionally, the method includes intercepting, via a Serial SCSI Protocol (SSP) target of the expander, commands directed to the selected logical volume responsive to the control unit initiating the migration. Still further, the method includes generating, via an SSP initiator of the expander, commands directed to the backup logical volume based on the intercepted commands, and providing, via the SSP initiator, the intercepted commands to the selected logical volume.

DETAILED DESCRIPTION OF THE DRAWINGS

Figure 1:
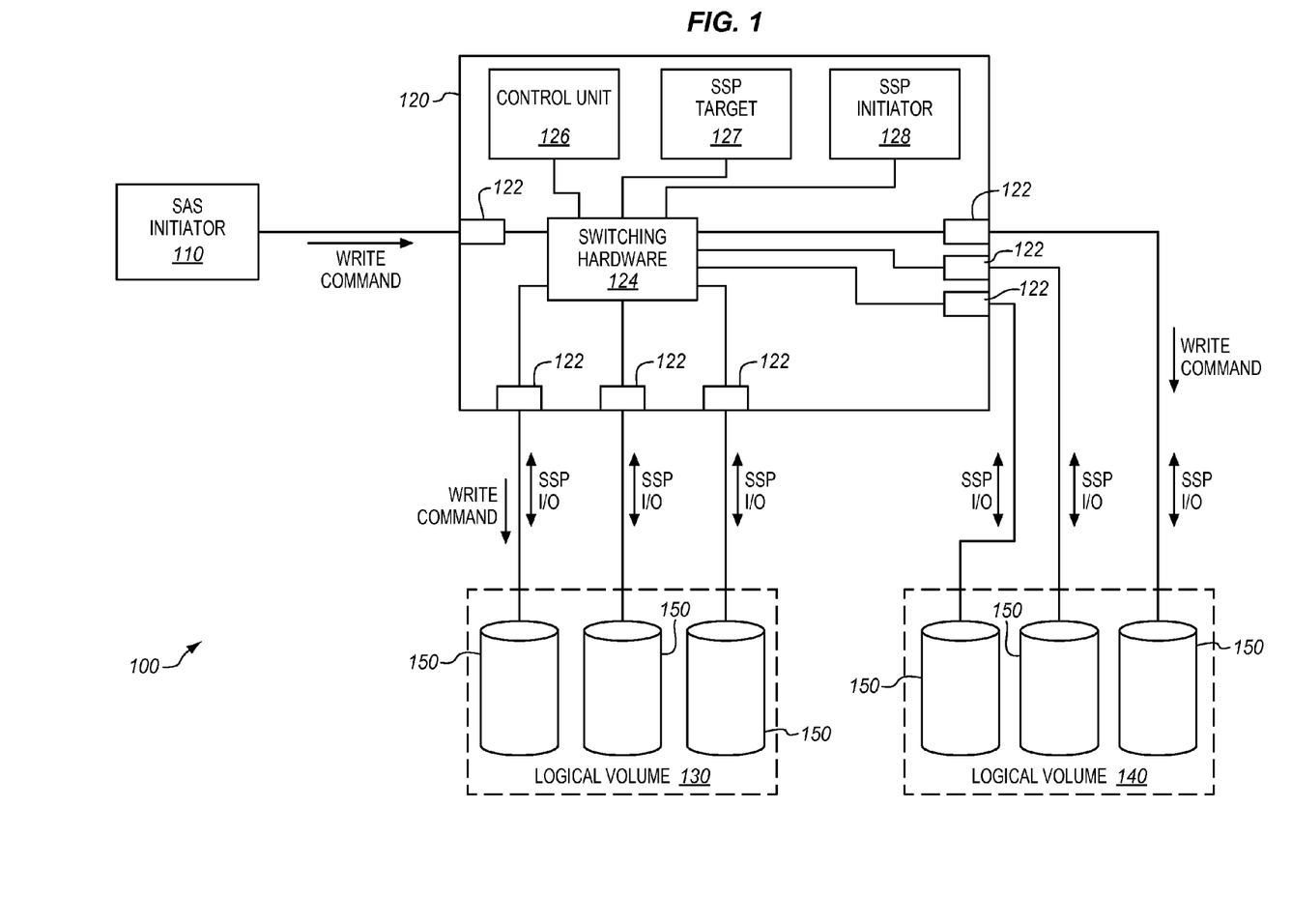
FIG. 1 is a block diagram of an exemplary SAS domain in accordance with features and aspects hereof

FIG. 1 is a block diagram of an exemplary SAS domain 100 in accordance with features and aspects hereof SAS domain 100 has been enhanced with SAS expander 120. Enhanced SAS expander 120 is capable of backing up/migrating data from one logical volume to another. This removes the need for a controller of the logical volume to perform such tasks, which enhances the performance of the controller with respect to processing host Input and Output (I/O) commands.

In this embodiment, SAS domain 100 includes SAS initiator 110, which generates commands on behalf of a host device. Commands from SAS initiator 110 are provided to storage devices 150 (which provision logical volumes 130 and 140) via enhanced SAS expander 120. Enhanced SAS expander 120 is capable of migrating (i.e., copying and/or moving) information from logical volume 130 to logical volume 140 during idle periods. Furthermore, during this migration process, enhanced expander 120 is capable of intercepting incoming commands generated by SAS initiator 110. If the incoming command is a write command directed to logical volume 130, then enhanced expander 120 may duplicate the write command at logical volume 140. This ensures consistency between the logical volumes during the migration process.

The host for SAS domain 100 may comprise any suitable system capable of performing processing operations upon stored data. For example, the host may comprise a general purpose computer, a server, a specialized hardware component, etc. I/O requests directed by the host to a logical volume include requests to provide data from the logical volume to the host, as well as requests to modify written data at the logical volume.

SAS initiator 110 comprises any suitable device operable to generate commands directed to a logical volume, based upon input from the host. Initiator 110 is further operable to perform various management tasks directed to the volumes that it manages (e.g., consistency checks, rebuilds, etc.). For example, initiator 110 may comprise a controller such as a Redundant Array of Independent Disks (RAID) controller. Initiator 110 may comprise an independent SAS device, a Host Bus Adapter (HBA) of a host, an integrated component of a host, etc.

Depending on the configuration of SAS domain 100, commands generated by SAS initiator 110 may be provided to expander 120 either directly or via a switched fabric of other SAS expanders. The number, configuration, and type of expanders that form the switched fabric may vary as a matter of design choice.

Logical volumes 130 and 140, which are managed by initiator 110, comprise allocated storage space and data provisioned on storage devices 150. Each volume may be set up in any suitable configuration (e.g., a RAID configuration, etc.), and the configuration data of each volume may be stored on the storage devices that provision it or on a controller that manages the volume. Each logical volume may be provisioned on a greater or lesser number of storage devices 150 as a matter of design choice. The storage devices need not be dedicated to one specific logical volume, but may also store data for a number of other logical volumes. Still further, a logical volume may be provisioned on multiple storage devices that are remotely located from each other on the SAS domain.

Storage devices 150 provision the storage capacity of the logical volumes, and may comprise any media and/or interfaces capable of storing and/or retrieving data in a computer-readable format. For example, the storage devices may comprise magnetic hard disks, solid state drives, optical media, etc. compliant with protocols for one or more of SAS, SATA, Fibre Channel, etc. The number of storage devices utilized by SAS domain 100 may vary as a matter of design choice.

Expander 120 is capable of routing commands between initiator 110 and storage devices 150 that provision logical volumes 130 and 140. For example, expander 120 may establish connections between initiator 110 and one or more of storage devices 150. Expander 120 has also been enhanced to determine that data from logical volume 130 (a "selected" volume) is ready for migration to logical volume 140 (a "backup" volume).

In this embodiment, expander 120 includes multiple SAS ports 122 which are connected via switching hardware 124. Control unit 126 manages the general operations of expander 120.

Each SAS port 122 comprises one or more physical links with associated transceivers (PHYs). Switching hardware 124 is operable to establish connections between various PHYs in order to enable communications between them. The operations of switching hardware 124 (e.g. a "crossbar" switch) are managed by control logic and hardware at expander 120, which in this embodiment is a component of control unit 126. Control unit 126 may be implemented, for example, as custom circuitry, as a special or general purpose processor executing programmed instructions stored in an associated program memory, or some combination thereof.

Enhanced SAS expander 120 further includes SSP target 127 and SSP initiator 128. During the backup/migration process, SSP initiator 128 generates various SSP I/O commands to migrate (e.g., copy and/or move) data from logical volume 130 to logical volume 140. For example, SSP initiator 128 may generate SSP read requests directed to the storage devices that provision logical volume 130, and then may generate corresponding SSP write requests (e.g., SSP write command frames) directed to the storage devices that provision logical volume 140. For example, data from a response to an SSP read request (directed to volume 130) may be used to generate one or more corresponding SSP write requests (directed to volume 140).

If SSP initiator 128 has its own SAS address then the responses will be directly provided to SSP initiator 128 via switching hardware 124. However, if SSP initiator 128 does not have its own SAS address, SSP initiator may "spoof" the SAS address of SAS expander 120 (or even SAS initiator 110). Switching hardware 124 may then selectively provide incoming responses to SSP initiator 128.

SSP initiator 128 may be integrated within control unit 126, or may comprise an independent processing element within expander 120. In one embodiment, SSP initiator 128 is associated with a SAS address and appears to other elements of SAS domain 100 as an end device coupled to expander 120.

Backup/migration commands to move/copy data from logical volume 130 to logical volume 140 may be generated during idle periods of control unit 126. For example, the commands may be performed as a low-priority background task at control unit 126. Idle periods at the expander may include those periods when there is a small/minimal volume of host I/O directed to the logical volumes, or when control unit 126 is not managing any host I/O. Control unit 126 may also monitor switching hardware 124 to detect idle periods (e.g., by reading specified registers at specified time intervals).

In one embodiment control unit 126 implements a task scheduling algorithm to manage the backup/migration process. Control unit 126 therefore assigns a different priority and task name to each different type of process that may be performed at expander 120 (e.g., Exception Handling, SMP Processing, Special Processing required for Host IOs, Background Backup Processing, etc. may each be assigned specific task priorities). The task scheduler breaks up processing into predetermined periods of time, and then provides a certain amount of time from each period to one or more types of processes. Further, for each period of time, a higher priority task may preempt a lower priority task. On completion of a high priority task, the task scheduler reviews a queue to determine if there are lower priority tasks (e.g., background backup tasks) ready for processing. If there is a background backup task that is ready, it executes for a certain percentage of a time period or until a higher priority task preempts it. The task scheduler may also adaptively adjust the amounts of time assigned to different tasks. For example, when a great deal of host I/O is being processed, the scheduler may give more time to these higher priority host I/O tasks. Inversely when host I/O, decreases the task scheduler may increase the portion of a time period that is assigned to backup tasks.

During the data migration between logical volumes 130 and 140, SSP target 127 engages in an active process to ensure that data integrity is preserved between logical volumes 130 and 140 even when host I/O alters the data on logical volume 130. SSP target 127 therefore actively intercepts incoming SSP commands from SAS initiator 110, and control unit 126 reviews the intercepted commands to determine whether the commands write to a logical volume that is currently being backed up. If the command is an SSP write command frame directed to logical volume 130, then control unit 126 directs SSP initiator 128 to duplicate the intercepted command to the storage devices that provision logical volume 140. In this manner, even if logical volume 130 is currently being modified by a host, logical volume 140 can still accurately mirror the contents of volume 130.

SSP target 127 may be integrated within control unit 126, or may comprise an independent processing element of expander 120. In one embodiment, SSP target 127 is associated with a SAS address and therefore appears to other elements of SAS domain 100 as an end device coupled to expander 120.

In further embodiments, SAS expander 120 may further include one or more Serial Management Protocol (SMP) targets that may be used to receive instructions for performing the backup process. For example, an SMP target may receive an SMP backup request from a management device. In further embodiments, SAS expander 120 may also include one or more Serial Advanced Technology Attachment (SATA) Tunneling Protocol (STP) initiators and or targets, in addition to or in place of SSP initiator 128 and SSP target 127. These STP components may perform similar operations to those of the SSP components described above.

Note that the particular arrangement of components described herein is merely intended to be exemplary, and one of ordinary skill in the art will appreciate that the specific arrangement and configuration of SAS domain components is merely a matter of design choice.

Figure 2:
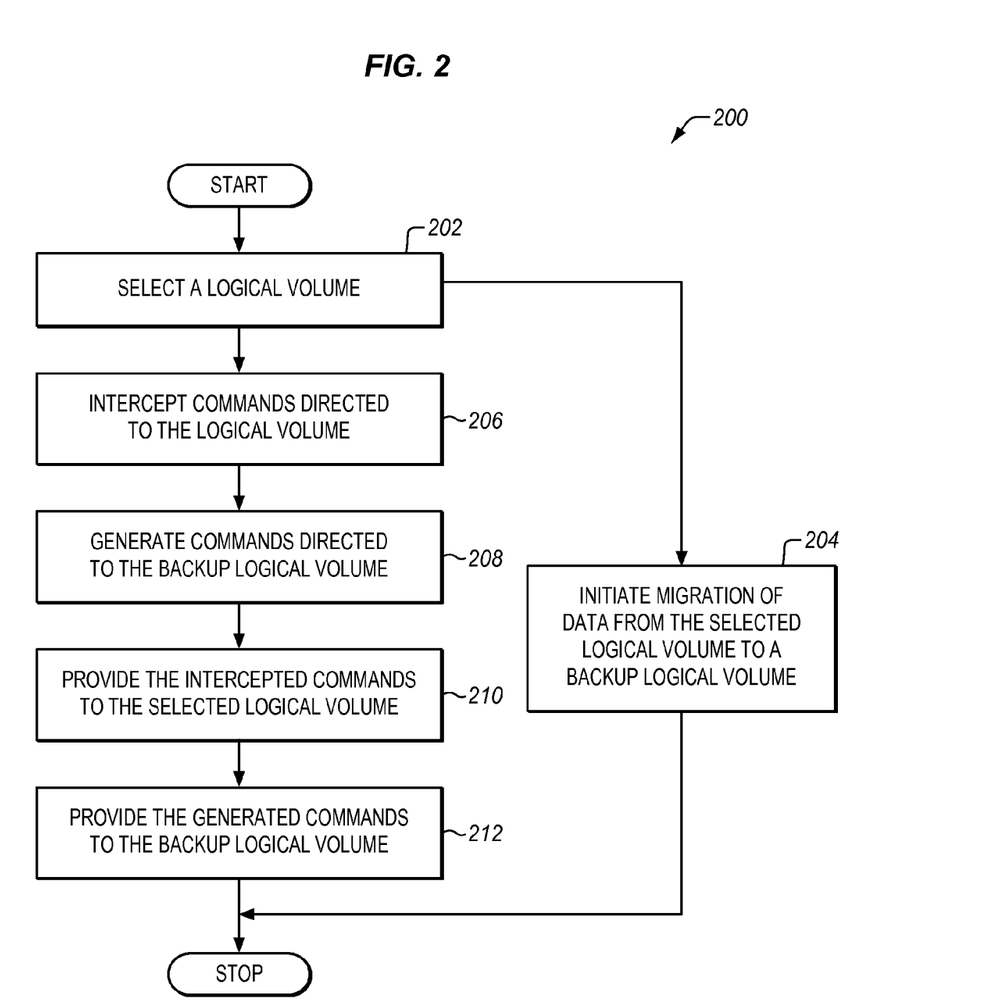
FIG. 2 is a flowchart describing an exemplary method in accordance with features and aspects hereof to operate a SAS expander to migrate a logical volume.

FIG. 2 is a flowchart describing an exemplary method 200 in accordance with features and aspects hereof to operate a SAS expander to migrate a logical volume. The method of FIG. 2 may be operable in a SAS domain such as described above with regard to FIG. 1. The steps of the flowcharts described herein are not all inclusive and may include other steps not shown. The steps described herein may also be performed in an alternative order.

In step 202, the SAS expander selects a logical volume to be migrated (i.e., copied or moved). The information defining the available logical volumes may be maintained internally at the SAS expander or may be received from an external source. The backup logical volume may be selected based upon any criteria (e.g., criteria stored within a memory of the SAS expander, externally provided criteria, etc.). For example, the SAS expander could periodically back up each of several logical volumes periodically or after a triggering event.

In a further example, the SAS expander may select the logical volume in response to receiving a Serial Management Protocol (SMP) message from a management device coupled with the SAS domain. The SMP message may further include information describing the configuration and extent of the selected logical volume as it resides on one or more storage devices. The SMP message may further indicate the configuration and extent of a destination logical volume to copy data to. A system administrator may generate such an SMP backup message by predicting a period of time with low host I/O load on logical volumes coupled with the expander (e.g., night hours or non-business hours).

In step 204, the SAS expander initiates migration of data from the selected logical volume to a backup logical volume. Initiating the migration process may include, for example, updating mapping information pertaining to the selected logical volume. The migration process itself may include waiting for idle (or low priority) periods at a control unit of the SAS expander, and using an SSP/STP initiator to migrate data from the selected volume to the backup volume during these idle periods as part of a background task. Because this operation utilizes idle periods at the expander, each command used to retrieve or write data as a part of the migration process may be entered into a queue for later execution when a processor of the SAS expander becomes available.

This step may further comprise maintaining progress information pertaining to the migration process. For example, the information may indicate the extent of Logical Block Addresses (LBAs) to copy from the selected volume to the backup volume, the last LBA that was copied, etc. This enables the expander to resume the migration process from a known point if the SAS expander encounters an error that causes the migration process to halt.

As the background migration of data between the volumes continues, the SAS expander may also engage in an active process to duplicate incoming host I/O to both volumes. This process is described in steps 206-212 below.

In step 206, the SAS expander intercepts commands directed to the selected logical volume (e.g., host I/O generated by a SAS initiator). These commands pertain to writing and/or reading from the logical volume. An SSP target within the SAS expander intercepts the incoming commands, and a control unit of the SAS expander reviews the commands. This review may include determining whether an intercepted command is an SSP and/or STP (SSP/STP) write command frame, determining whether the intercepted command will modify data at the selected logical volume, etc.

If the commands will modify the data of the selected logical volume (i.e., the logical volume that is currently being backed up or migrated), then new commands directed to the backup logical volume are generated by an SSP/STP initiator of the SAS expander in step 208. For example, each SSP command with a command code 0f 0x06 and a write SCSI Command Descriptor Block (CDB) will have an operation code (opcode). Opcodes of 2Ah, AAh, and 8Ah indicate various types of writes. Thus, based on the opcode, a control unit of the SAS expander can determine whether the intercepted command is an SSP write command or not.

After review, the intercepted commands are provided to the selected logical volume in step 210. Further, the newly generated commands for the backup volume are provided to the backup volume in step 212. Note that steps 206-212 may often occur as substantially concurrent activities. Thus, the backup logical volume remains consistent with the selected logical volume, even when the selected logical volume is altered by incoming host I/O.

Thus, steps 206-212 (for maintaining consistency between the two logical volumes whenever a write is performed by a host) may be performed substantially concurrently with duplicating data to the backup volume in step 204. Step 204 may be performed as an idle process, while steps 206-212 may include more active, high-priority activities.

Using method 200 of FIG. 2 described above, a SAS expander can be used to perform data migration and/or backup tasks that would normally be performed by a controller of a logical volume. This frees up processing resources at the controller, allowing the controller to use its resources to process host I/O, which improves the overall performance of the logical volume with respect to interactions with the host.

Figure 3:
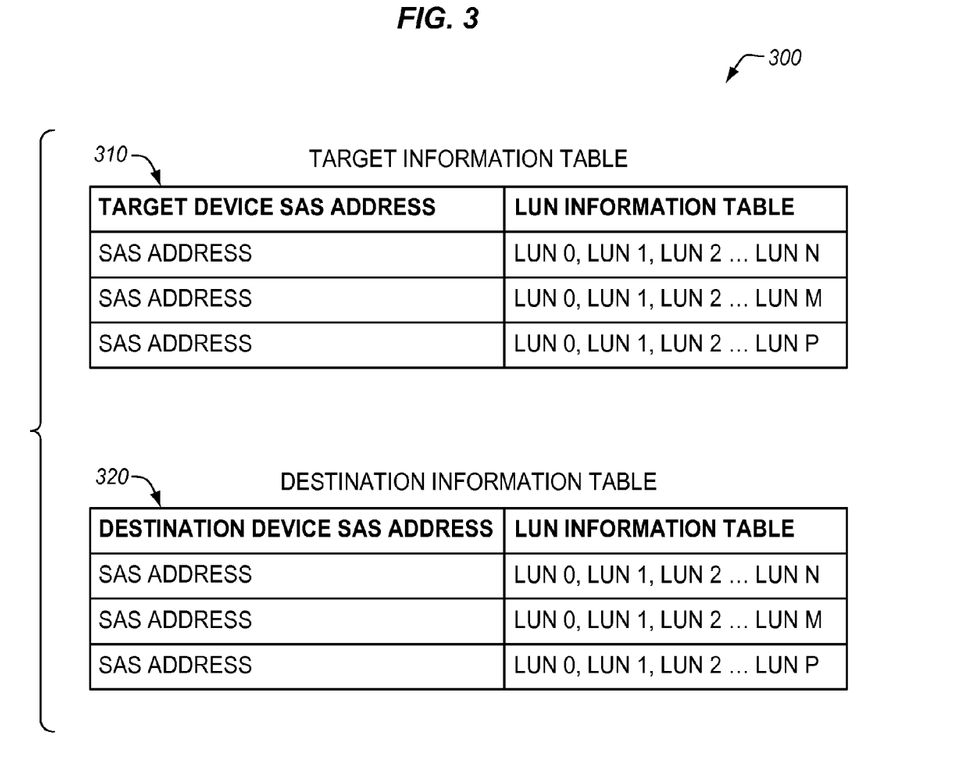
FIG. 3 is a block diagram illustrating an exemplary mapping table in accordance with features and aspects hereof.

FIG. 3 is a block diagram illustrating an exemplary mapping table 300 in accordance with features and aspects hereof According to FIG. 3, mapping table 300 includes a target device information table 310 (i.e., a set of "source" devices from which data is copied) as well as a destination information table 320 (i.e., a set of "backup" devices to which data is copied). Target device information table 310 includes the SAS address of each target device, as well as a list indicating the Logical Unit Numbers (LUNs) implemented by each target device. This may include, for example, the LBAs utilized by each LUN. Similarly, destination information table 320 may include the SAS address of each destination device and a list indicating the LUNs for each destination device.

In one embodiment, the mapping table information described above is generated by the SAS expander itself. For example, if the SAS expander is connected to a RAID Bunch of Disks (RBOD), the SAS expander may use its SSP initiator to generate Report LUN SSP frames directed to the RBOD to determine the configuration of the selected logical volume. The SAS expander may then acquire SSP responses from a controller of the RBOD, and may generate a LUN table for the selected logical volume based upon the acquired SSP responses. In a further embodiment, the SAS expander directly queries coupled storage devices to determine the configuration of the logical volumes that they provision. In a still further embodiment, the SAS initiator acquires information describing the extent and location of the logical volume as it resides on the storage devices from an SMP message provided by a management device.

Figure 4:
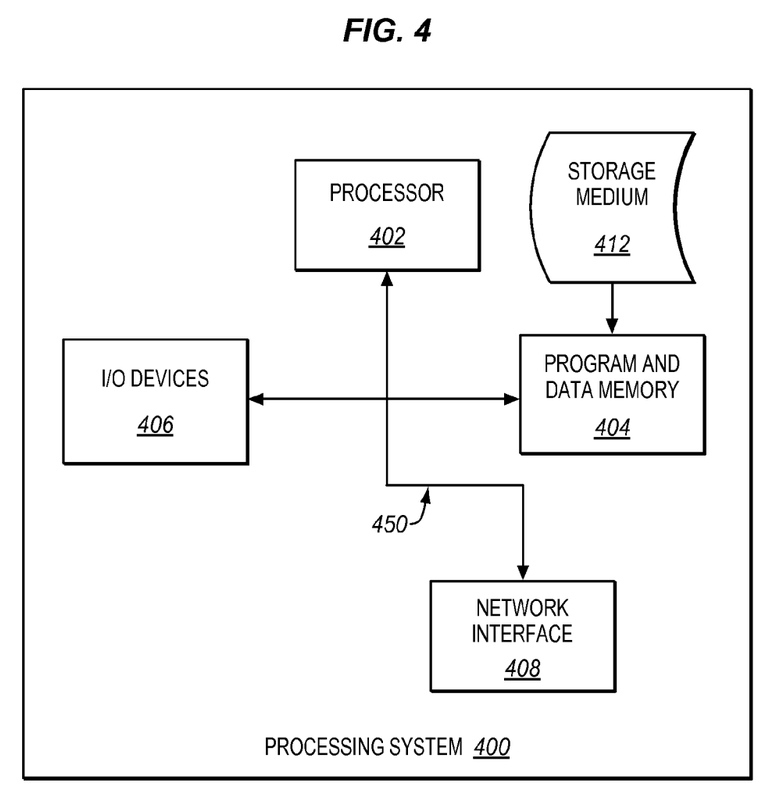
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of a SAS expander to perform the various operations disclosed herein. FIG. 4 illustrates a processing system 400, such as within expander 120 of FIG. 1, operable to execute a computer readable medium embodying programmed instructions to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (e.g., PHYs) may further be included. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
a plurality of physical links with associated transceivers (PHYs);
a control unit operable to select a logical volume, and to initiate migration of data from the selected logical volume to a backup logical volume;
a Serial SCSI Protocol (SSP) target of the expander operable to intercept commands directed to the selected logical volume responsive to the control unit initiating the migration; and
an SSP initiator of the expander operable to generate commands directed to the backup logical volume based on the intercepted commands, and to provide the intercepted commands to the selected logical volume.

2. The expander of claim 1 wherein:
the control unit is further operable to determine whether an intercepted command is an SSP write command frame, and is further operable to direct the SSP initiator to generate a write command directed to the backup logical volume responsive to determining that an intercepted command comprises an SSP write command frame.

3. The expander of claim 2 wherein:
the control unit is further operable to determine whether an intercepted SSP write command frame is directed to the selected logical volume, and is further operable to direct the SSP initiator to generate a write command directed to the backup logical volume responsive to determining that the intercepted SSP write command frame is directed to the selected logical volume.

4. The expander of claim 1 wherein:
the control unit is further operable to determine that the SAS expander is idle, and to trigger the generation of commands at the SSP initiator responsive to determining that the SAS expander is idle.

5. The expander of claim 1 wherein:
the control unit is further operable to initiate the migration responsive to receiving an SMP request.

6. The expander of claim 1 wherein:
the control unit is further operable to maintain a log indicating the progress of the migration.

7. The expander of claim 6 wherein:
the control unit is further operable to utilize the log to resume the migration after the migration has been halted.

8. The expander of claim 1 wherein:
the control unit is further operable to maintain a table indicating the configuration of the selected logical volume as it resides on one or more storage devices.

9. The expander of claim 8 wherein:
the control unit is further operable to maintain the table by directing the SSP initiator to generate SSP command Report Logical Unit Number (LUN) frames to the storage devices, to acquire SSP responses from each of the coupled storage devices, and to generate a LUN table for the selected logical volume based upon the acquired SSP responses.

10. A method for operating a Serial Attached SCSI (SAS) expander, the method comprising:
selecting, via a control unit of the expander, a logical volume;
initiating, via the control unit, migration of data from the selected logical volume to a backup logical volume;
intercepting, via a Serial SCSI Protocol (SSP) target of the expander, commands directed to the selected logical volume responsive to the control unit initiating the migration;
generating, via an SSP initiator of the expander, commands directed to the backup logical volume based on the intercepted commands; and
providing, via the SSP initiator, the intercepted commands to the selected logical volume.

11. The method of claim 10 further comprising:
determining, via the control unit, whether an intercepted command comprises an SSP write command frame; and
directing the SSP initiator, via the control unit, to generate a write command directed to the backup logical volume responsive to determining that the intercepted command comprises an SSP write command frame.

12. The method of claim 11 wherein:
the control unit is further operable to determine whether an intercepted SSP write command frame is directed to the selected logical volume, and is further operable to direct the SSP initiator to generate a write command directed to the backup logical volume responsive to determining that the intercepted SSP write command frame is directed to the selected logical volume.

13. The method of claim 10 wherein:
the control unit is further operable to determine that the SAS expander is idle, and to trigger the generation of write commands at the SSP initiator responsive to determining that the SAS expander is idle.

14. The method of claim 10 wherein:
the control unit is further operable to initiate the migration responsive to receiving an SMP request.

15. The method of claim 10 wherein:
the control unit is further operable to maintain a log indicating the progress of the migration.

16. The expander of claim 15 wherein:
the control unit is further operable to utilize the log to resume the migration after the migration has been halted.

17. The method of claim 10 wherein:
the control unit is further operable to maintain a table indicating the configuration of the selected logical volume as it resides on one or more storage devices.

18. The method of claim 17 wherein:
the control unit is further operable to maintain the table by directing the SSP initiator to generate SSP command Report Logical Unit Number (LUN) frames to the storage devices, to acquire SSP responses from each of the coupled storage devices, and to generate a LUN table for the selected logical volume based upon the acquired SSP responses.

19. A non-transitory computer readable medium embodying programmed instructions which, when executed by a processor, are operable for performing a method for operating a Serial Attached SCSI (SAS) expander, the method comprising:
selecting, via a control unit of the expander, a logical volume;
initiating, via the control unit, migration of data from the selected logical volume to a backup logical volume;
intercepting, via a Serial SCSI Protocol (SSP) target of the expander, commands directed to the selected logical volume responsive to the control unit initiating the migration; and
generating, via an SSP initiator of the expander, commands directed to the backup logical volume based on the intercepted commands; and
providing, via the SSP initiator, the intercepted commands to the selected logical volume.

20. The medium of claim 19, the method further comprising:
determining, via the control unit, whether an intercepted command comprises an SSP write command frame; and
directing the SSP initiator, via the control unit, to generate a write command directed to the backup logical volume responsive to determining that the intercepted command comprises an SSP write command frame.

* * * * *